United States Patent
Lee (10) Patent No.: US 9,417,723 B2
(45) Date of Patent: Aug. 16, 2016

(54) METHOD FOR CONTROLLING OPERATION OF TOUCH PANEL AND PORTABLE TERMINAL SUPPORTING THE SAME

(71) Applicant: Samsung Electronics Co., Ltd., Suwon-si, Gyeonggi-do (KR)

(72) Inventor: Jin Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/335,270

(22) Filed: Jul. 18, 2014

(65) Prior Publication Data

US 2014/0327638 A1  Nov. 6, 2014

Related U.S. Application Data

(63) Continuation of application No. 13/324,064, filed on Dec. 13, 2011, now Pat. No. 8,803,828.

(30) Foreign Application Priority Data

Dec. 13, 2010  (KR) .................. 10-2010-0126739

(51) Int. Cl.
*G06F 3/041*  (2006.01)
*H04B 15/04*  (2006.01)

(52) U.S. Cl.
CPC ............. *G06F 3/041* (2013.01); *G06F 3/0418* (2013.01); *H04B 15/04* (2013.01); *H04M 2250/22* (2013.01)

(58) Field of Classification Search
CPC .......................................... G06F 3/041
USPC ............................................ 345/173
See application file for complete search history.

(56) References Cited

U.S. PATENT DOCUMENTS

| | | |
|---|---|---|
| 2004/0171349 A1 | 9/2004 | Sakaguchi |
| 2007/0120831 A1 | 5/2007 | Mahowald et al. |
| 2008/0162996 A1 | 7/2008 | Krah et al. |
| 2008/0165157 A1 | 7/2008 | Fu et al. |
| 2009/0002343 A1 | 1/2009 | Land et al. |
| 2009/0138745 A1 | 5/2009 | Dorsey et al. |
| 2011/0248937 A1 | 10/2011 | Suzuki |

FOREIGN PATENT DOCUMENTS

| | | |
|---|---|---|
| GB | 2 450 396 A | 12/2008 |
| JP | 2010252004 A * | 11/2010 |

* cited by examiner

*Primary Examiner* — Jason Olson
(74) *Attorney, Agent, or Firm* — Jefferson IP Law, LLP (57) ABSTRACT

A method and portable terminal for controlling an operation of a touch panel are provided. The portable terminal includes a memory for storing at least one program for supporting a user function operated based on a certain frequency upon activation of the user function, a touch panel, activated when the user function is supported, for supporting a touch function, and a controller for selecting frequency information that does not interfere with the certain frequency for operating the corresponding user function when the at least one user function is activated, and for setting the selected frequency information as a scanning frequency of the touch panel.

18 Claims, 4 Drawing Sheets

METHOD FOR CONTROLLING OPERATION OF TOUCH PANEL AND PORTABLE TERMINAL SUPPORTING THE SAME

CROSS-REFERENCE TO RELATED APPLICATION(S)

This application is a continuation application of a prior application Ser. No. 13/324,064, filed on Dec. 13, 2011, which claimed the benefit under 35 U.S.C §119(a) of a Korean patent application filed on Dec. 13, 2010 in the Korean Intellectual Property Office and assigned Serial number 10-2010-0126739, the entire disclosure of which is hereby incorporated by reference.

BACKGROUND OF THE INVENTION

1. Field of the Invention

The present invention relates to a portable terminal. More particularly, the present invention relates to a method for controlling an operation of a touch panel and a portable terminal supporting the same.

2. Description of the Related Art

Portable terminals support a call function based on mobility and have been used widely due to convenient utility and easy portability. Portable terminals provide various input methods to provide user functions. For example, a typical portable terminal provides a touch screen including a touch panel and a display unit. A user may process an operation on the touch panel performed to select a specific image output on the display unit. The typical portable terminal creates a touch event due to a corresponding user operation and controls an application program corresponding to a user function based on the created touch event.

The typical portable terminal simultaneously drives a touch panel and a display unit, performs a specific operation according to a generation location and a type of a touch event occurring on the touch panel, and outputs a corresponding image application on the display unit. The touch panel performs a scanning operation for a predetermined time period to collect touch events. However, the periodic scanning operation frequently interferes with other accessory modules in the portable terminal Accordingly, the portable terminal has a problem in that noise occurs in a user function of a corresponding accessory module. Moreover, a typical portable terminal has a problem in that it cannot perform a normal operation of a touch panel due to the occurrence of noise caused by a scanning operation of a touch panel.

SUMMARY OF THE INVENTION

Aspects of the present invention are to address at least the above-mentioned problems and/or disadvantages and to provide at least the advantages described below. Accordingly, an aspect of the present invention is to provide a method for controlling an operation of a touch panel capable of normally operating a user function and a touch panel by changing a scanning period operating the touch panel according to a type of user function to minimize an interference phenomenon occurring between the touch panel and the user function of the portable terminal, and a portable terminal supporting the same.

Another aspect of the present invention is to provide a method for controlling an operation of a touch panel that may restrain the occurrence of noise due to scanning the touch panel, and a portable terminal supporting the same.

In accordance with an aspect of the present invention, a method for controlling an operation of a touch panel is provided. The method includes activating at least one user function provided from a terminal, determining whether the at least one activated user function is a user function operated based on a certain frequency, selecting frequency information that does not interfere with the certain frequency when the activated user function is the user function operated based on the certain frequency, setting the selected frequency information as a scanning frequency of the touch panel, and operating the touch panel based on the set scanning frequency.

In accordance with another aspect of the present invention, a portable terminal for supporting operation control of a touch panel is provided. The terminal includes a memory for storing at least one program supporting a user function operated based on a certain frequency upon activation of the user function, a touch panel, activated when the user function is supported, for supporting a touch function, and a controller for selecting frequency information that does not interfere with the certain frequency for operating the corresponding user function when the at least one user function is activated, and for setting the selected frequency information as a scanning frequency of the touch panel.

A method for controlling an operation of a touch panel and a portable terminal supporting the same according to an aspect of the present invention may stably drive a touch panel without the occurrence of error upon operation of various user functions of the portable terminal.

Further, an aspect of the present invention is to restrain the occurrence of noise according to scanning the touch panel. In addition, the present invention may remove interference between functions according to scanning a touch panel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
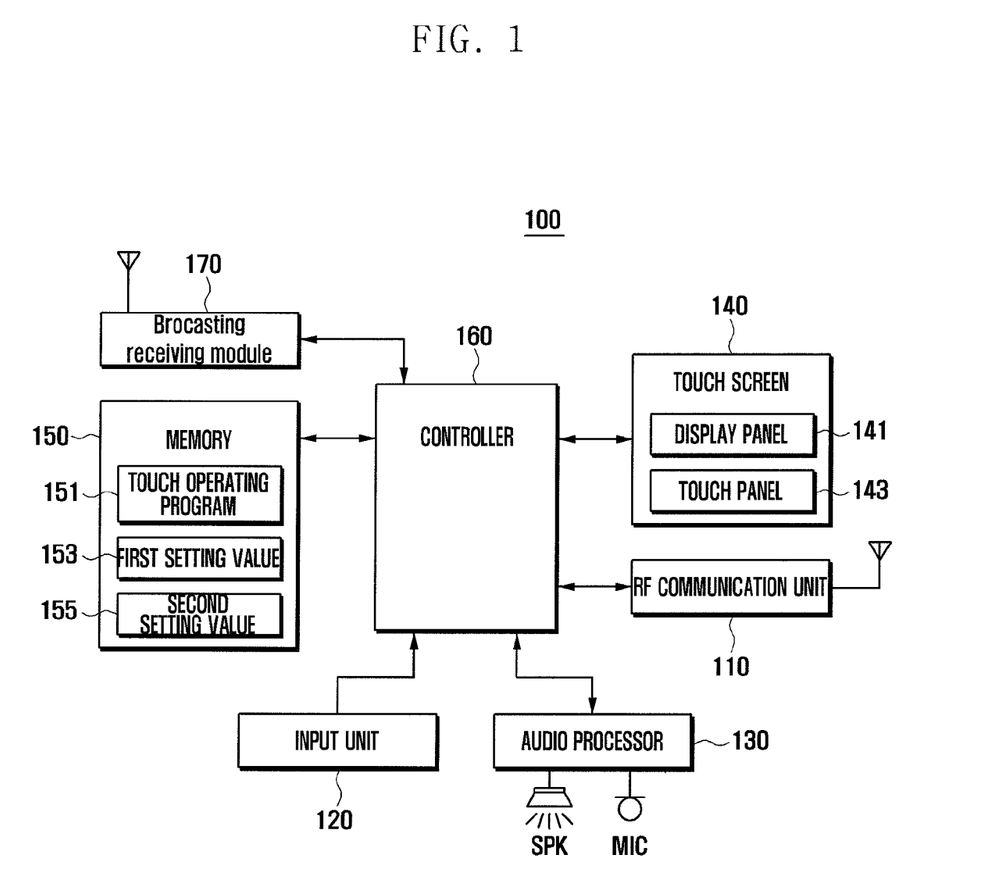
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, a portable terminal 100 may include a Radio Frequency (RF) communication unit 110, an input unit 120, an audio processor 130, a touch screen 140, a memory 150, a broadcasting receiving module 170, and a controller 160.

The portable terminal 100 may identify a currently activated user function and change a scanning period for operating a touch panel according to various frequency environments operated in a corresponding user function in order to stably support operations of a user function and a touch panel regardless of the user function. The portable terminal 100 is described below in more detail.

The RF communication unit 110 forms a first communication channel for voice calls, a second communication channel for video calls, and a third communication channel for transmitting data such as images or messages under the control of the controller 160. The RF unit 110 forms a voice call channel, a data communication channel, and a video call channel between mobile communication systems. To do this, the RF communication unit 110 may include an RF transmitter for up-converting a frequency of a transmitted signal and for amplifying the signal, and an RF receiver for low-noise-amplifying a received signal and for down-converting the signal.

A user function based on the RF communication unit 110 may be selected and activated according to a touch event occurring on the touch panel 143 or may be selected and activated according to an input signal from the input unit 120. For example, while a specific phone number included in a phone book is output on the display unit 141, when a user touches a touch panel 143 on an output area of the corresponding phone number for a set time, the RF unit may be activated to form a communication channel based on the corresponding phone number. When the portable terminal 100 has a communication service function, the RF unit 110 may be included. If the portable terminal 100 does not support a separate communication service function, the RF unit may be omitted.

The portable terminal 100 may identify frequency information used for an operation of the RF communication unit 110 upon operation of the RF communication unit 110, and determine corresponding frequency information and frequency information for operating the touch panel in order to determine whether a frequency for operating the RF communication unit 110 is included in a frequency range that may interfere with the touch panel 143. If an operating frequency of the RF communication unit 110 is included in a frequency range interfering with an operation of the touch panel 143, the portable terminal 100 may control a scanning frequency of the touch panel 143 to be operated based on a scanning frequency having a predetermined difference so as not to interfere with an operating frequency of the RF communication unit 110.

The input unit 120 may receive input of numerals or text information and includes a plurality of input keys and functions keys for setting all types of functions. The function keys may include arrow keys, side keys, and hot keys set to execute specific functions. The input unit 120 generates a key signal associated with user setting and function control of a portable terminal 100 and provides the generated key signal to the controller 160. The input unit 120 may be implemented by a Qwerty key pad, a 3*4 key pad, or a 4*3 key pad. The input unit 120 may be implemented by a Qwerty key map, a 3*4 key map, a 4*3 key map, or a control key map. When the touch screen 140 is supported in a full touch screen form, the input unit 120 may include only a side key provided at a side of a case of the portable terminal 100. The input unit 120 may generate and transfer input signals capable of activating a user function of the portable terminal 100, for example, an input signal for activating the broadcasting receiving module 170 and an input signal for activating the RF communication unit 110 to the controller 160 according to user control.

The audio processor 130 includes a speaker SPK for playing transmitted and received audio data at a call time, audio data included in a received message, and audio data according to playback of audio files stored in the memory 150; and a microphone MIC for collecting a user's voice or other audio signals at the call time. When a touch operation occurs on a touch panel 143 of the portable terminal 100 to create a corresponding specific touch event, the audio processor 130 may output an effect sound according to the touch event. An output of the effect sound according to the touch event may be removed according to a user setting. If a scanning frequency of the touch panel 143 changes, the audio processor 130 may selectively output a corresponding alarm according to a user setting.

The touch screen 140 includes a display unit 141 and a touch panel 143. The touch panel 143 may be disposed at a front surface of the display unit 141. The size of the touch screen 140 may be determined depending on the size of the touch panel 143.

The display panel 141 displays all types of menus of the portable device 100, information input by a user, or information provided to the user. The display unit 141 may provide various screens according to the use of the portable terminal 100, such as an idle screen, a menu screen, a message creation screen, and a call screen. The display unit 141 may be configured by a flat panel display such as a Liquid Crystal Display (LCD) or an Organic Light Emitting Diode (OLED). The display unit 141 may be provided at an upper portion or a lower portion of the touch panel 143. The display unit 141 may be driven under the control of the controller 160. The display panel 141 may output information regarding frequency variation for scanning a touch event of the touch panel 143. For example, the display panel 141 may output scanning frequency information allotted to operate a current touch panel 143 together with frequency information applied to a currently activated user function. The foregoing information may be output for a predetermined time in an initial time point when a user function is activated and then removed from a screen or may be continuously output on a side of the screen to a termination time of a corresponding user function. Output of the corresponding information may be omitted according to a user setting or intention.

The touch panel 143 is disposed in at least one of an upper portion or a lower portion of the display unit 141. The touch panel 143 may generate a touch event according to a contact or approach distance of an object and transfer the generated touch event to the control unit 160. Sensors constituting the touch panel may be arranged in a matrix pattern. Corresponding location information on the touch panel 143 and information regarding a type of a touch event are transferred to the control unit 160 according to a touch event occurring on the touch panel 143. The controller 160 determines location information and a type of a touch event transferred from the touch panel 143. The controller 160 may identify specific information of the display unit 141 mapped to a corresponding location and then activate a user function linked to the corresponding specific information.

To collect the touch events, the touch panel 143 performs a scanning operation for a predetermined time period. The scanning operation of the touch panel 143 may be controlled according to a currently activated user function. When a currently activated user function uses a predetermined frequency band identical to a scanning period operating the touch panel 143 or a frequency band that may resonate with a corresponding frequency band, the touch panel 143 may perform a scanning operation based on frequency information differing from the predetermined frequency band or another frequency information except for a resonant frequency with the corresponding frequency band. When the currently activated user function changes to support a corresponding user function based on another frequency band, the touch panel 143 may perform a scanning operation based on a frequency band that does not interfere with at least one currently operated frequency band. When a separate frequency is not operated, the touch panel 143 may perform a scanning operation based on a preset scanning frequency. For example, if a broadcasting receiving function is operated by activation of a current broadcasting receiving module 170, the touch panel 143 may select and operate a frequency that does not interfere with frequency bands operated in the broadcasting receiving module 170 as a scanning frequency. When the broadcasting receiving module 170 is operated based on frequencies such as VHF1, VHF2, and UHF, the touch panel 143 may select and operate frequency information differing from the frequency bands and frequency information that does not interfere with corresponding frequency bands.

The memory 150 may store information regarding a key map, a menu map, or a touch lock part cancellation area for an operation of the touch screen 140 as well as an application program used for a function operation according to an exemplary embodiment of the present invention. The key map or the menu map may each have various forms. The key map may include a keyboard map, a 3*4 key map, a Qwerty key map, or a control key map for controlling an operation of a currently activated application program. The menu map may include a menu map for controlling an operation of the currently activated application program. The memory 150 may include a program area and a data area.

The program area may store an Operating System (OS) for booting the portable terminal 100 and for operations of respective constructions, and application programs for playing various files, such as an application program for supporting a call function of the portable terminal 100, a web browser for accessing an Internet server, an MP3 application program for playing other sound sources, an image output application program for displaying photographs, a moving image playing application program, and a program for supporting various user functions such as an analog broadcasting receiving function, a digital broadcasting receiving function, a long distance wireless communication function, and a near distance wireless communication function. The program area of the present invention may also store a touch operating program 151.

The touch operating program 151 is loaded in the controller 160 when the touch panel 143 is activated according to schedule information, and supports an operation of the touch panel 143. The touch operating program 151 may include a routine for controlling power supply of the touch panel 143, a routine for determining the presence of frequency operation of a currently activated user function, a routine for determining a corresponding frequency band upon activation of a user function based on the frequency operation, a routine for determining a scanning frequency setting value previously stored in the memory 150 to select a frequency that does not interfere with frequency bands for at least one user function, and a routine for applying the selected frequency as the scanning frequency. The touch operating program 151 may further include a routine for acquiring frequency information associated with a corresponding user function where a scanning frequency setting value regarding a currently activated user function is not stored in the memory 150, and a routine for selecting frequency information that does not interfere with the acquired frequency information and for applying the selected frequency information to the touch panel 143. The touch operating program 151 may also include a routine for associating a user function with new scanning frequency information applied to the touch panel 143 and for storing the user function, and a routine for analyzing associated information stored in the memory 150 in order to acquire corresponding scanning frequency information where the same user function is activated afterwards and for operating the touch panel 143 based on the acquired scanning frequency information. The scanning frequency information associated with the specific user function may be previously stored by a designer or manufacturer.

The data area stores data created according to use of the portable terminal 100, and may store phone book data, at least one icon according to a widget function, and various contents. The data area may store user input achieved by the touch panel 143. In particular, the data area may store various information created on the touch panel 143. In particular, the data area may store a setting value of the touch panel 143. For example, when the specific user function is activated, the data area may store a first setting value 153 for setting a scanning frequency. When another user function is activated, the data area may store a second setting value 155 for setting the scanning frequency. The data area may also store another scanning frequency setting value that does not interfere with a corresponding frequency with respect to respective user functions operated based on a specific frequency.

The broadcasting receiving module 170 supports a broadcasting receiving function of the portable terminal 100. The broadcasting receiving module 170 operates a predetermined frequency band, and includes an antenna supporting a corresponding frequency band therefor. The broadcasting receiving module 170 demodulates and decodes signals received through a corresponding antenna, and controls the audio processor 130 and the display panel 141 to output audio data and video data included in the decoded signals. The broadcasting receiving module 170 may receive a signal in one of an analog TV scheme or a digital TV scheme according to the intention of a designer or manufacturer. To do this, the broadcasting receiving module 170 may include an antenna according to a broadcasting scheme supported from the broadcasting receiving module 170, and may operate various broadcasting receiving frequencies according to each support scheme or a selection channel.

The control unit 160 controls power supplied to respective constructions of the portable terminal 100 to execute an initialization procedure. The controller 160 may adjust a scanning period of the touch panel 143 according to an exemplary embodiment of the present invention. An example of the controller 160 is described below with respect to FIG. 2.

Figure 2:
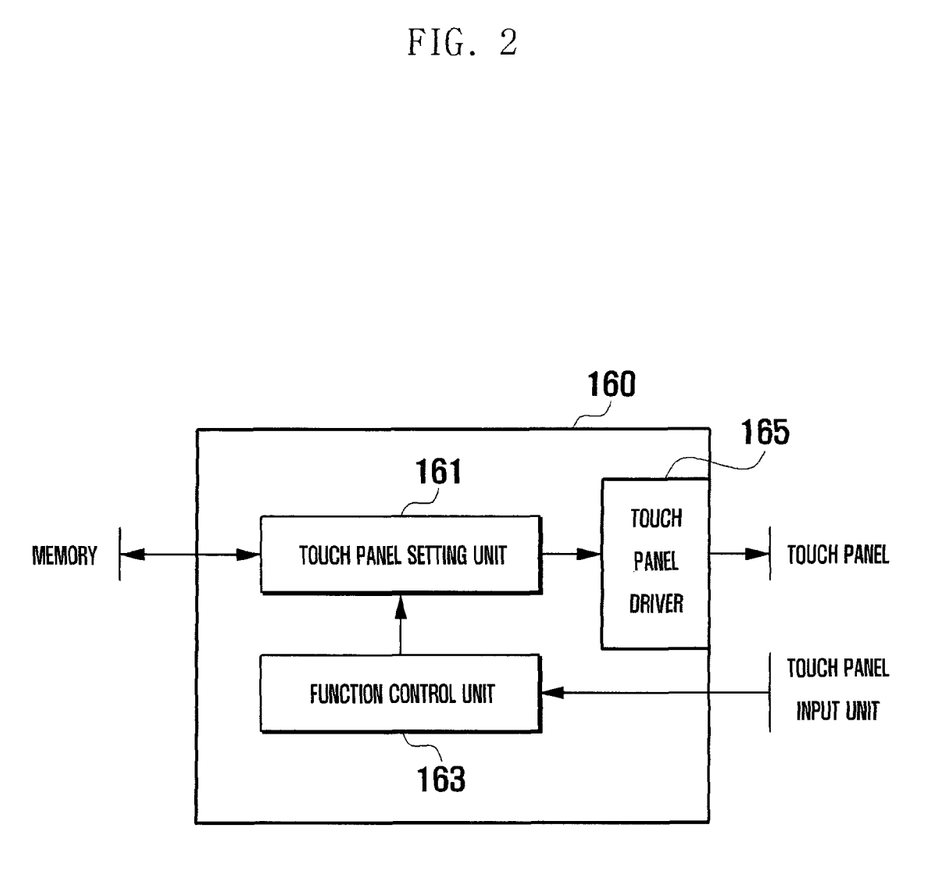
FIG. 2 is a block diagram illustrating a controller shown in FIG. 1 according to an exemplary embodiment of the present invention.

FIG. 2 is a block diagram illustrating a controller 160 shown in FIG. 1 according to an exemplary embodiment of the present invention.

Referring to FIG. 2, the controller 160 may include a touch panel setting unit 161, a function control unit 163, and a touch panel driver 165.

The touch panel setting unit 161 transfers information regarding a scanning frequency for operating the touch panel 143 to the touch panel driver 165. The touch panel setting unit 161 may transfer setting values stored in the memory 150, for example, one of a first setting value 153 or a second setting value 155 to the touch panel driver 165 according to a signal provided from the function control unit 163.

The touch panel driver 165 drives a scanning period of the touch panel 143 differently according to a setting value provided from the touch panel setting unit 161. When the touch panel setting unit 161 transfers the first setting value 153, the touch panel driver 165 operates scanning of the touch panel 143 based on a scanning frequency indicated by the first setting value 153. When the touch panel setting unit 161 transfers the second setting value 155, the touch panel driver 165 may control a scanning period based on a scanning frequency indicated by the second setting value 155.

The function control unit 163 identifies an input signal input from the input unit 120 or the touch panel 143 to activate a corresponding user function. For example, when the user creates an input signal to activate the broadcasting receiving module 170, the function control unit 163 loads an application program for operating the broadcasting receiving module 170 from the memory 150 and activates the broadcasting receiving module 170 according to the created input signal. The function control unit 163 may receive a broadcasting signal provided from a broadcasting system through an activated application program and the broadcasting receiving module 170, and demodulate and decode the received broadcasting signal to output corresponding audio data and video data. In this procedure, the function control unit 163 may transfer information associated with a user function activated according to the input signal to the touch panel setting unit 161. Accordingly, the touch panel setting unit 161 may identify a scanning frequency setting value according to information associated with the user function provided from the function controller 163 from the memory 150, and transfer a corresponding setting value to the touch panel driver 165.

When information regarding the scanning frequency setting value provided from the function controller 163 is not included in the memory 150, the touch panel setting unit 161 may analyze the information regarding the user function to determine the frequency in which the user function is being operated. To do this, the touch panel setting unit 161 may analyze information of a function module supporting a corresponding user function, and acquire information regarding frequency operation from corresponding information. The touch panel setting unit 161 may monitor a function module operated according to a currently activated user function to monitor a frequency of a transmitted or received signal, thereby detecting a frequency operation value according to a corresponding user function. If frequency value information of a user function selected by a user is acquired in various schemes, the touch panel setting unit 161 may select optional frequency information that does not interfere with a corresponding frequency and transfer the selected optional frequency information to the touch panel driver 165. The touch panel setting unit 161 identifies a plurality of scanning frequency information operable by the touch panel driver 165 in advance such that the touch panel driver 165 may select operable scanning frequencies.

As illustrated above, when at least one currently activated user function operates at least one certain frequency, the portable terminal 100 operates a scanning period of the touch panel 143 based on frequency information that does not interfere with a corresponding frequency to prevent the occurrence of noise of a user function according to a scanning operation of the touch panel 143 and to prevent an erroneous operation of the touch panel 143.

The foregoing exemplary embodiment has explained a configuration of the portable terminal 100 and functions thereof. An exemplary method for controlling an operation of a touch panel operated through the foregoing portable terminal 100 is described below with reference to the accompanying drawings.

Figure 3:
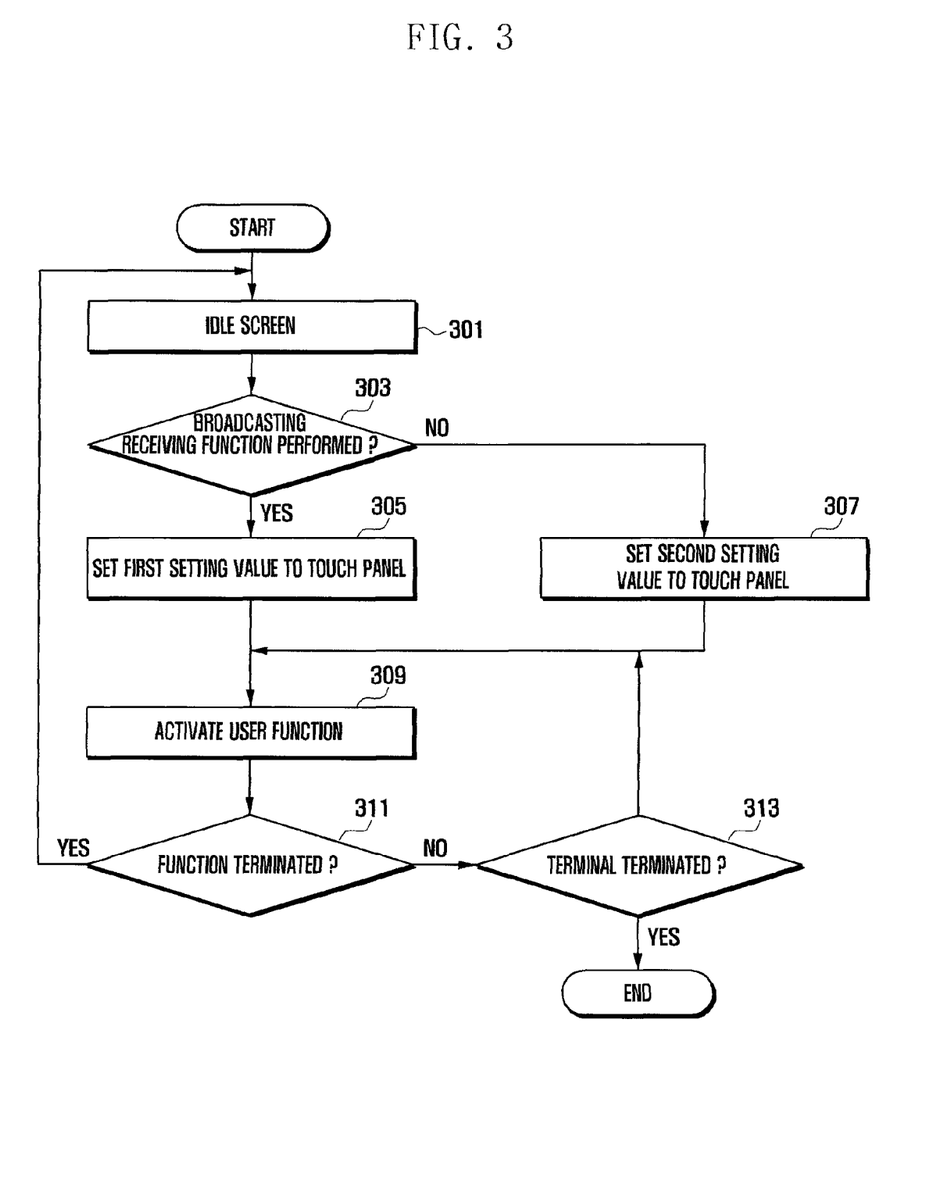
FIG. 3 is a flowchart illustrating an operation method for a touch panel according to an exemplary embodiment of the present invention.

FIG. 3 is a flowchart illustrating an operation method for a touch panel in a portable terminal according to an exemplary embodiment of the present invention. A user function based on a certain frequency of the portable terminal 100 is described below as a representative example of a broadcasting receiving function. However, exemplary embodiments of the present invention are not limited thereto. Exemplary embodiments of the present invention are applicable to various frequency based user functions such as wired/wireless long distance communication and near distance communication.

Referring to FIG. 3, when power is supplied to the portable terminal 100, the controller 160 initializes the portable terminal 100 using the supplied power and control output of an idle screen according to set schedule information in step 301.

The controller 160 determines whether to perform a broadcasting receiving function operating a certain frequency in step 303. To do this, the controller 160 may control the touch panel 143 to be operated based on a preset scanning frequency setting value and determine whether selection of a user function according to a touch event occurring on the touch panel 143 is an event for selecting a broadcasting receiving function. The controller 160 may determine whether a signal input from an input unit 120 is a signal for activating the broadcasting receiving function.

When a signal input from the input unit 120 or a touch panel 143 is the signal for activating the broadcasting receiving function at step 303, the controller 160 identifies a first setting value 153 set to be operated upon activation of the broadcasting receiving function from a memory 150, and sets a scanning frequency to the touch panel 143 based on the first setting value 153 in step 305. The first setting value 153 may be frequency information that does not interfere with frequencies operated in a broadcasting receiving module 170 supporting the broadcasting receiving function.

If a signal for activating a user function regardless of operation of a broadcasting receiving function, namely, without performing operation of a separate frequency is input, the controller 160 sets a scanning frequency of the touch panel 143 based on a second setting value in step 307. The second setting value is a preset certain scanning frequency setting value, and may be a scanning frequency value of a touch panel 143 set while outputting the touch panel 143.

The controller 160 activates a user function and controls the touch panel 143 to be operated based on a preset scanning frequency setting value in step 309.

If an input signal for terminating a corresponding user function is generated in step 311, the controller 160 returns to step 301. If the input signal for terminating a corresponding user function is not generated, the controller 160 determines whether an input signal for terminating the portable terminal is generated in step 313. If the input signal for terminating the portable terminal is not generated, the processor returns to step 309 and the controller 160 maintains execution of a corresponding function.

When a portable terminal 100 according to an exemplary embodiment of the present invention supports a multi-media function to enable a user to perform respective user functions based on operation of respective certain frequencies while activating and operating a plurality of user functions, the portable terminal 100 may set a scanning frequency to a touch panel 143. The user may operate a broadcasting receiving module 170 to generate an input for watching broadcasting while performing near distance communication using a portable terminal 100 with a near distance communication module. Accordingly, the controller 160 may identify scanning frequency setting value information of a touch panel 143 according to a currently activated near distance communication function and scanning frequency setting value information of the touch panel according to the broadcasting receiving function. The controller 160 may also determine whether respective setting values of two user functions have an overlapping region. If the scanning frequency setting values have an overlapping region or are included in a region capable of causing interference, the controller 160 may select another scanning frequency setting value and operate the touch panel 143 based on a newly selected scanning frequency setting value. When the scanning frequency setting values do not overlap, the controller 160 may operate the touch panel 143 based on a default set scanning frequency setting value, such as a scanning frequency setting value supported upon activation of the broadcasting receiving function.

Figure 4:
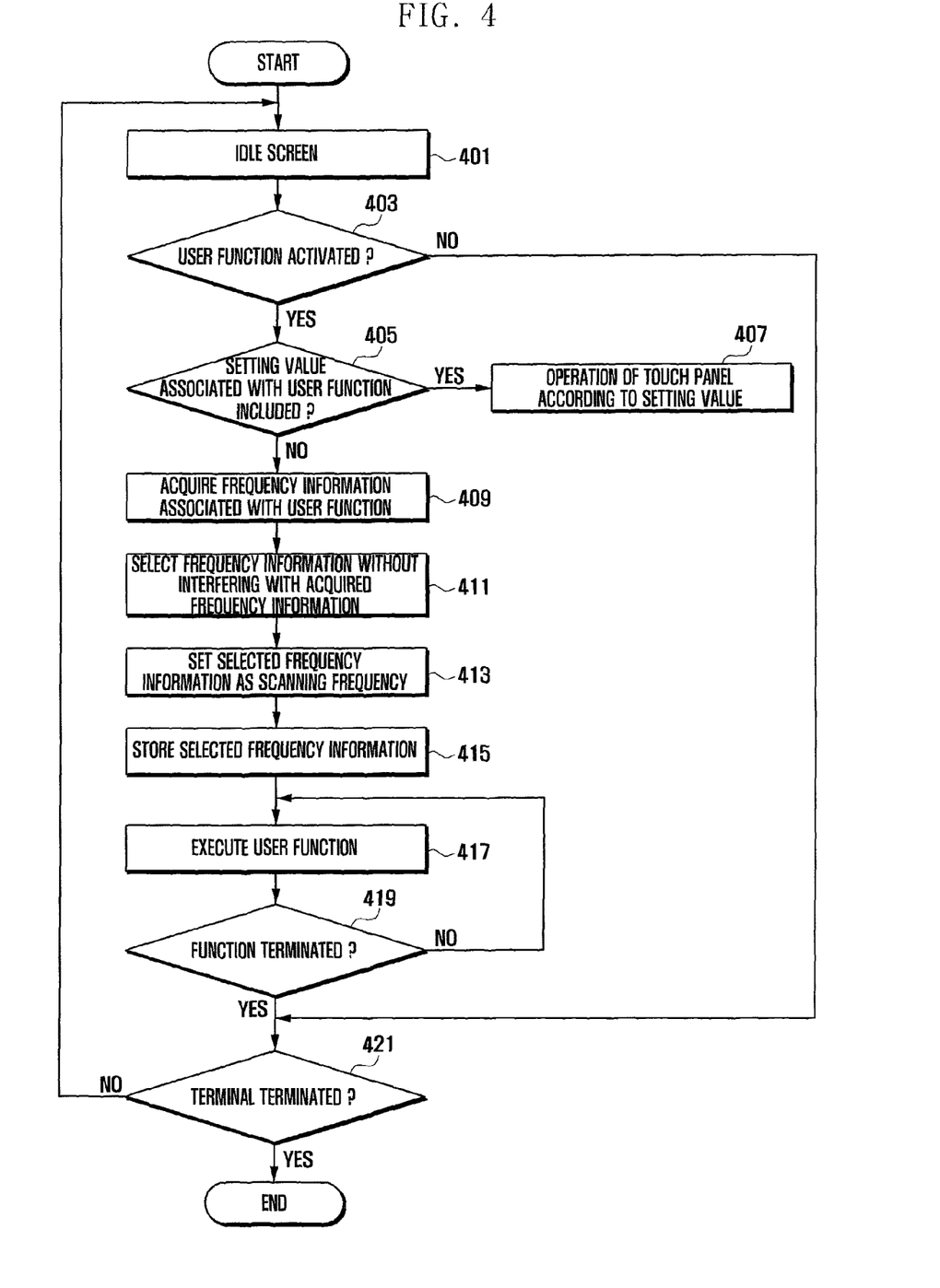
FIG. 4 is a flowchart illustrating an operation method for a touch panel according to another exemplary embodiment of the present invention.

FIG. 4 is a flowchart illustrating an operation method for a touch panel according to another exemplary embodiment of the present invention.

Referring to FIG. 4, when power is supplied to the portable terminal 100 as in step 301, the controller 160 initializes respective components thereof using the supplied power and control output of an idle screen according to set schedule information in step 401.

The controller 160 determines whether an input signal for activating a user function is generated in step 403. If the input signal for activating a user function is generated, the controller 160 determines whether a scanning frequency setting value associated with the user function operating the touch panel 143 is included in a memory 150 in step 405. When a corresponding setting value is included in the memory 150, the controller 160 executes an operation of a touch panel 143 according to the setting value as illustrated in FIG. 3 in step 407.

Conversely, when the setting value associated with the user function is not included in the memory 150, the controller 160 acquires frequency information associated with the user function in step 409. The controller 160 may refer to currently activated user function information, identify a function module supporting the user function, or analyze a signal transmitted/received by a corresponding function module to detect frequency information.

The controller 160 may select frequency information that does not interfere with the acquired frequency information in step 411. The controller may select frequency information operable in the touch panel 143 in order not to interfere with the acquired frequency information.

The controller 160 sets the selected frequency information as a scanning frequency in step 413. The controller 160 transfers the selected frequency information to a touch panel driver 165 to set a scanning frequency of the touch panel 143. Simultaneously, the controller 160 stores the selected frequency information in the memory 150 in step 415. In this procedure, the controller 160 may link the selected frequency information with a currently activated user function to search a previous setting value upon activation of a corresponding function afterwards and control the memory 150 in order to store the selected frequency information.

The controller 160 may execute a corresponding user function based on an activated touch panel 143 in step 417. The controller 160 may determine whether an input signal for terminating a function is generated in step 419. When the input signal for terminating a function is not generated, the controller 160 returns to step 417 and maintains an execution procedure of the user function.

When the input signal for terminating a function is generated at step 419, the controller 160 terminates a corresponding user function.

The controller 160 determines whether an input signal for terminating the portable terminal is generated in step 421. If the input signal for terminating the portable terminal is not generated, the processor returns to step 401.

The controller 160 may collect and store scanning frequency information of a touch panel associated with a user function operated based on a certain frequency while performing the foregoing procedures.

As described above, a portable terminal 100 according to an exemplary embodiment of the present invention may change a scanning frequency in order not to interfere with a scanning frequency of the touch panel 143 in connection with frequency information of a currently activated user function in a procedure operating the touch panel 143 to remove noise of the user function and to stably operate the touch panel 143.

A method for controlling an operation of a touch panel according to another exemplary embodiment of the present invention may perform a setting value determining procedure, a touch panel operating procedure, and a setting value storing procedure when scanning frequency setting value information of a touch panel 143 associated with a currently activated user function is not stored in advance to adaptively operate the touch panel 143 with respect to various user functions or new user functions.

The foregoing portable terminal 100 may further include various additional modules according to provision forms. When the portable terminal 100 is a communication terminal, the portable terminal 100 may include constructions that are not mentioned, such as a near distance communication module for near distance communication, a camera module for photographing still images/moving images of a subject, an interface for exchanging data in a wired communication scheme or a wireless communication scheme of the portable terminal 100, an Internet communication module for communicating with an Internet to perform an Internet function, and a digital broadcasting module for receiving and broadcasting digital broadcasting. As the structural elements may be variously changed according to a convergence trend of a digital device, these elements are omitted for purposes of clarity. However, the portable terminal 100 may include structural elements equivalent to the foregoing structural elements. The portable terminal 100 according to exemplary embodiments of the present invention may be substituted by specific constructions in the foregoing arrangements according to the provided form or another structure. This can be easily understood to those skilled in the present art.

The portable terminal 100 according to an exemplary embodiment of the present invention may be one of various types of devices having a communication module capable of performing data communication. For example, the portable terminal 100 may be an information communication device and/or a multimedia device, such as a Portable Multimedia Player (PMP), a digital broadcasting player, a Personal Digital Assistant (PDA), a music player (e.g., MP3 player), a portable game terminal, a smart phone, a notebook computer, and a handheld PC, as well as various mobile communication terminals corresponding to various communication systems.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
    activating a first function in an electronic device;
    measuring a first frequency corresponding to the first function;
    determining a second frequency based at least in part on the first function such that the second frequency does not interfere with the first frequency; and
    executing a second function using the second frequency while the first function is activated,
    wherein the determining of the second frequency comprises:
        acquiring the first frequency from a function module which supports the first function if the second frequency associated with the first function is not stored in a memory; and
        selecting, as the second frequency, a frequency that does not interfere with the acquired first frequency.

2. The method of claim 1, wherein the first function comprises at least one of a broadcasting receiving function of an analog scheme, a broadcasting receiving function of a digital scheme, a long distance wireless communication function, a near distance wireless communication function, or a multimedia function.

3. The method of claim 1, wherein the first frequency is to be selected from a first range of frequencies, and the second frequency is to be selected from a portion of a second range of frequencies, the portion not overlapping with the first range.

4. The method of claim 1, wherein the measuring comprises:
    monitoring a signal received or transmitted in relation with the first function; and
        identifying the first frequency based at least in part on the signal.

5. The method of claim 1, wherein the determining comprises:
    selecting, as the second frequency, a frequency having a specified difference in value from that of the first frequency.

6. The method of claim 1, wherein the second function comprises a touch operation provided via a touch sense panel operatively coupled with the electronic device.

7. The method of claim 1, wherein the executing comprises:
    presenting an indication indicating that the second frequency has been changed compared to a frequency previously used to execute the second function.

8. The method of claim 1, further comprising:
    storing, in memory operatively coupled with the electronic device, the second frequency as associated with the first function.

9. An apparatus comprising:
    a memory configured to store frequency data; and
    a controller operatively coupled with the memory, the controller configured to:
        activate a first function in the apparatus;
        measure a first frequency corresponding to the first function;
        determine a second frequency base at least in part on the first function such that the second frequency does not interfere with the first frequency;
        execute a second function using the second frequency while the first function is activated;
        acquire the first frequency from a function module which supports the first function if the second frequency associated with the first function is not stored in the memory; and
        select, as the second frequency, a frequency that does not interfere with the acquired first frequency.

10. The apparatus of claim 9, wherein the first function comprises at least one of a broadcasting receiving function of an analog scheme, a broadcasting receiving function of a digital scheme, a long distance wireless communication function, a near distance wireless communication function, or a multimedia function.

11. The apparatus of claim 9, wherein the second frequency is to be selected from a range of frequencies that does not overlap with the first frequency.

12. The apparatus of claim 9, wherein the controller is further configured to:
    monitor a signal received or transmitted in relation with the first function; and
    identify the first frequency based at least in part on the signal.

13. The apparatus of claim 9, wherein the controller is further configured to:
    select, as the second frequency, a frequency having a specified difference in value from that of the first frequency.

14. The apparatus of claim 9, wherein the second function comprises a touch operation provided via a touch sense panel operatively coupled with the apparatus.

15. The apparatus of claim 9, wherein the controller is further configured to:
    present an audio signal based at least in part on a determination that the second frequency has been changed.

16. The apparatus of claim 9, wherein the controller is further configured to:
    store, in the memory, the second frequency as associated with the first function.

17. A non-transitory machine-readable storage medium storing instructions that, when executed by one or more processors, cause the one or more processors to perform operations comprising:
    activating a first function in an electronic device;
    measuring a first frequency corresponding to the first function;
    determining a second frequency based at least in part on the first function such that the second frequency does not interfere with the first frequency; and executing a second function using the second frequency while the first function is activated, wherein the determining of the second frequency comprises acquiring the first frequency from a function module which supports the first function if the second frequency associated with the first function is not stored in a memory and selecting, as the second frequency, a frequency that does not interfere with the acquired first frequency.

18. The machine-readable storage medium of claim 17, wherein the determining comprises:

selecting, as the second frequency, a frequency of which value is not stored in memory.

* * * * *